Feb. 14, 1961     E. R. WAGNER     2,971,770

BALL JOINT ASSEMBLY FOR VEHICLE WHEEL SUSPENSION

Filed March 24, 1958

INVENTOR.

BY Elmer R. Wagner

Paul Gilpatrick

ATTORNEY

2,971,770

BALL JOINT ASSEMBLY FOR VEHICLE WHEEL SUSPENSION

Elmer R. Wagner, Bay City, Mich., assignor to General Motors Corporation, Detroit, Mich., a corporation of Delaware Filed Mar. 24, 1958, Ser. No. 723,576

5 Claims. (Cl. 280—96.1)

This invention relates to a ball joint particularly adapted for use in an automotive vehicle in which the front or dirigible wheels are independently connected to the vehicle frame through suspension means of the wishbone type. In such application, the joint is applied to best advantage at the point of connection of the lower of the two control arms and the steering knuckle.

Suspension systems of the category here involved allow each front wheel to rise and fall, due to road surface irregularities, without appreciably affecting the opposite wheel. The control arms, between which the metal or air spring is disposed, are pivotally connected via rubber bushed joints to the vehicle frame and extend laterally of the frame in vertically spaced relation. At their outward ends the arms are joined through the steering knuckle which carries the wheel spindle. This knuckle is adapted for connection to the steering linkage and mounts at each end a ball stud socketed in the end of the corresponding control arm. For a description of a suspension arrangement as described, see, for example, United States Patent No. 2,797,930.

Although significant improvement have been made of late in the construction of the ball joints between the steering knuckle and the control arms, due primarily to the high front end loadings characterizing modern vehicles, rotary and tilting motion at these joints still requires the overcoming of much frictional resistance, especially where the joints are not kept properly lubricated. And lubrication of such joints has always been a problem because their exposed location renders them vulnerable to forces, particularly splash water or slush, tending to remove the lubricant.

As suggested, a principal object of the invention is to provide a ball joint for the purpose indicated which reduces friction and which is less dependent for proper operation on the use of lubricants.

A corollary object is to provide a joint which is readily assembled and installed and which may be produced at a cost rendering its general use in the automotive field feasible.

Still other objects and features of the invention will be apparent from the following description of a preferred embodiment thereof. The description will proceed with reference to the accompanying drawings in which.

Figure 1:
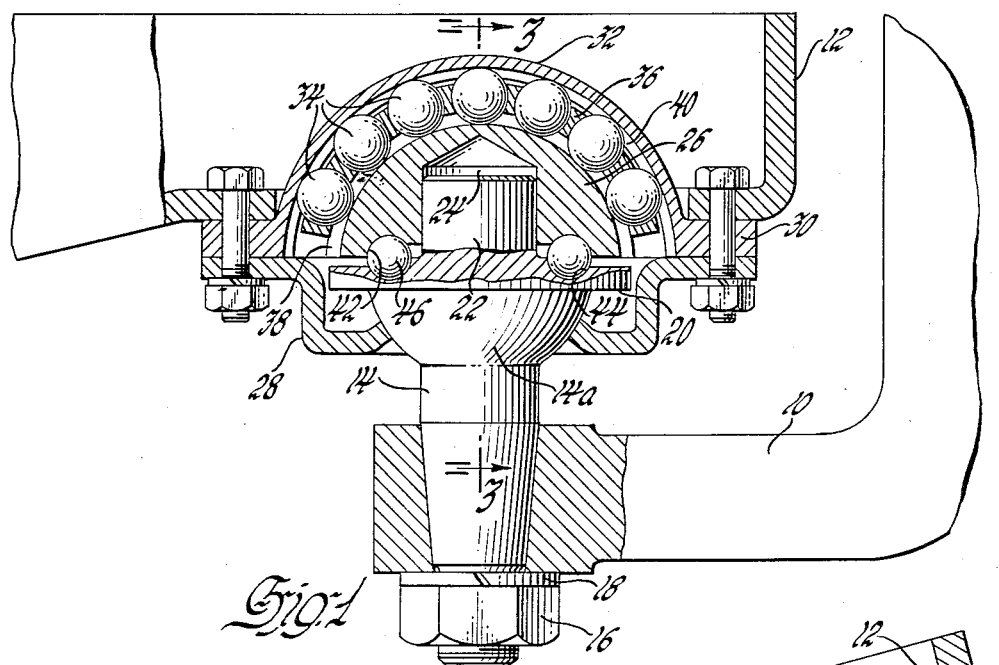
Figure 1 shows the particular joint partly in section and partly in elevation.

In the drawings, the numerals 10 and 12 respectively denote the lower portion of a steering knuckle and a portion of the lower arm component of a conventional wishbone type front end suspension.

Knuckle 10 is apertured to receive the frusto-conical portion of a ball stud 14, which is threaded below the knuckle for the reception of a nut 16, secured against loosening by a lock washer 18. Stud 14 will be seen as flanged at 20 and as comprising a pilot portion 22 finding accommodation in a recess 24 formed in a hemispherical member 26. Portion 22 not only facilitates assembly of the joint but precludes radial displacement of the stud relative to member 26.

Figure 3:
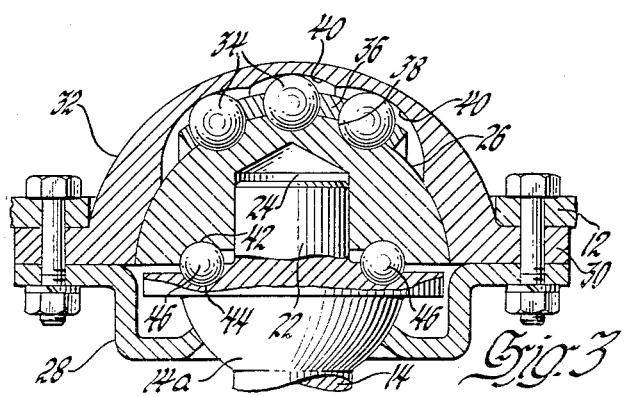
Figure 3 is a view on the line 3—3 in Figure 1.

A retainer piece 28 has a circular opening through which the shank of the stud 14 is passed at assembly and seats the ball portion 14a of the stud. The retainer is shown bolted to the control arm 12 through the flange portion 30 of a socket-providing cover 32. Interposed between such cover and the hemispherical member 26 are a plurality of trains of balls 34 (Figure 3). These balls are maintained in proper spaced relation by a cage element 36 and in operation of the joint follow arcuate paths of motion, as determined by grooves 38 in the hemispherical member 26 and grooves 40 in the cover 32. The latter grooves are not in strict conformity with the balls for a reason which will subsequently appear.

In addition to the grooves 38, the hemispherical member 26 has therein a groove 42 complementary to a groove 44 formed in the surface of the stud 14 about the pilot portion 22 thereof. The two grooves provide a circular course for a train of balls 46.

With the construction as described and illustrated, it should be apparenet that when the knuckle 10 is rotated about the axis of the stud 14 incident to steering of the vehicle the ball bearings 46 take the turning load while the upper bearing balls 34 operate to restrain any tendency of the hemispherical member 26 to rotate with the stud. On the other hand, tilting movement of the control arm 12 relative to the knuckle 10, occurring on spring deflection, proceeds with rolling of the balls 34 along the paths defined by the grooves 38 in hemispherical member 26 and the grooves 40 in the cover piece 32, balls 46 coming into play only in the event of steering action during the spring deflection.

Figure 2:
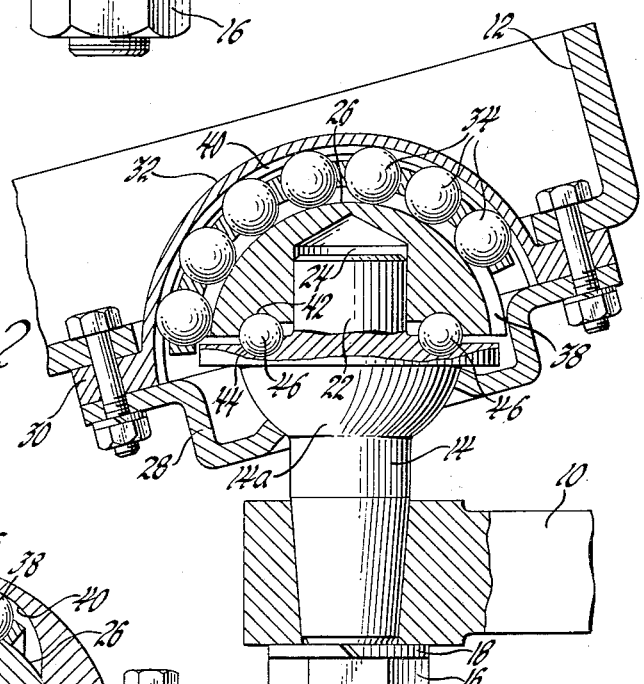
Figure 2 illustrates the action of the joint during spring deflection.

Due to the lack of conformity between balls 34 and the grooves 40 in the cover piece 32 (Fig. 3) a slight tilting of the control arm 12 relative to the stud 14 in a plane at right angles to the normal plane of tilting, shown in Figure 2, is possible. Provision for such tilting is essential because of the resilience of the suspension members. Thus, the rubber bushings hereinbefore mentioned through which the control arms are connected to the vehicle frame tend to become compressed under braking and acceleration loads, which cause slight fore and aft rocking of the control arms. Such rocking is reflected in the present ball joint by corresponding lateral displacement of the balls 34 in the grooves 40 (Fig. 3), and by slight axial movement of the stud 14.

What is claimed is:

1. In a suspension system including a steering knuckle and a control arm, a ball joint interconnecting said knuckle and said arm comprising: a stud member connected at one end to said knuckle and having a radially enlarged portion at its other end, a retainer element secured to said arm and seating said radially enlarged portion of said stud, a cover piece fixed to said arm and forming a socket, a hemispherical member carried in such socket with its flat face in juxta-position to said radially enlarged portion of said stud, anti-friction means in the form of a plurality of balls between said cover piece and said hemispherical member and between said hemispherical member and said portion of said stud, race means confining said anti-friction means, said race means permitting rotary movement of said stud relative to said cover piece and said hemispherical member and bi-planar tilting of said cover piece relative to said hemispherical member and said stud, the tilting motion in one plane being slight as compared to the tilting motion in the other plane.

2. In a suspension system including a steering knuckle and a control arm, a ball joint interconnecting said knuckle and said arm comprising: a stud member connected at one end to said knuckle and having a radially enlarged portion at its other end, a retainer element secured to said arm and seating said radially enlarged portion of said stud, a cover piece fixed to said arm and forming a socket, a hemispherical member carried in such socket with its flat face in juxta-position to said radially enlarged portion of said stud, a plurality of balls confined in complementary annular grooves formed in said face of said hemispherical member and the adjacent surface of said portion of said stud, and a caged ball train between said cover piece and said hemispherical member, said ball train in operation of the joint following a path set by complementary arcuate grooves in said cover piece and said hemispherical member, one of said grooves being out of conformity with respect to the ball contour to allow restricted tilting of said cover piece relative to said stud and said hemispherical member in a plane at right angles to the plane of said arcuate grooves.

3. In a suspension system including a steering knuckle and a control arm having a socket therein, a joint interconnecting said knuckle and arm comprising: a stud interconnected at one end to said knuckle and having a radially enlarged portion at its other end, means carried by said arm and seating said radially enlarged portion of said stud, a member within said socket having a rounded surface, anti-friction means in the form of a plurality of balls between the internal wall of said socket and such rounded surface and between said member and said portion of said stud, race means confining said anti-friction means, said race means permitting rotary movement of said stud relative to said socket and said member and bi-planar tilting of said socket relative to said member and said stud, the tilting motion in one plane being slight as compared to the tilting motion in the other plane.

4. In a suspension system including a steering knuckle and a control arm having a socket therein, a joint interconnecting said knuckle and arm comprising: a stud interconnected at one end to said knuckle and having a radially enlarged portion at its other end, means secured to said arm and seating said radially enlarged portion of said stud, a member within said socket having a rounded surface, a plurality of balls confined in complementary annular grooves formed in the adjacent surfaces of said member and said portion of said stud, and a ball train between the internal wall of said socket and the rounded surface of said member, said ball train in operation of the joint following a path set by complementary arcuate grooves in said wall and the said rounded surface, one of said arcuate grooves being out of conformity with respect to the ball contour to allow restricted tilting of said socket relative to said member and said stud in a plane at right angles to the plane of said arcuate grooves.

5. In a suspension system including a steering knuckle and a control arm, a joint interconnecting said knuckle and arm comprising socket means carried by said arm, stud means on said knuckle extending toward said socket means, retainer means carried by said arm for locating said stud relative to said socket means, a member within the socket having a surface complementary to the wall of the socket, ball means between such surface and said wall and between said member and said stud, and race means confining said ball means, said race means permitting rotary movement of said stud relative to said socket means and said member and biplanar tilting of said socket means relative to said stud and said member, the tilting motion in one plane being slight as compared to the tilting motion in the other plane.

References Cited in the file of this patent

UNITED STATES PATENTS

| 2,027,138 | Zerk | Jan. 7, 1936 |
| 2,167,984 | Leighton | Aug. 1, 1939 |
| 2,614,873 | Booth | Oct. 21, 1952 |
| 2,631,044 | Booth | Mar. 10, 1953 |
| 2,645,510 | Booth | July 14, 1953 |
| 2,779,603 | McRae | Jan. 29, 1957 |